(12) United States Patent
Waddell et al.

(10) Patent No.: US 8,032,994 B2
(45) Date of Patent: Oct. 11, 2011

(54) MARKING AND FASTENING DEVICE AND METHOD OF USING SAME

(75) Inventors: Raymond J. Waddell, Vernon (CA); Dean A. Myrfield, Vernon (CA)

(73) Assignee: EZ-Snap Products Inc., Vernon (CA)

( * ) Notice: Subject to any disclaimer, the term of this patent is extended or adjusted under 35 U.S.C. 154(b) by 0 days.

(21) Appl. No.: 12/662,381

(22) Filed: Apr. 14, 2010

(65) Prior Publication Data
US 2010/0199466 A1     Aug. 12, 2010

Related U.S. Application Data

(63) Continuation of application No. 11/241,441, filed on Sep. 29, 2005, now Pat. No. 7,735,235.

(51) Int. Cl.
*A44B 1/34* (2006.01)

(52) U.S. Cl. ............... 24/90.1; 24/453; 24/104; 24/103; 411/509

(58) Field of Classification Search .......... None
See application file for complete search history.

(56) References Cited

U.S. PATENT DOCUMENTS

| | | |
|---|---|---|
| 1,594,416 A | 8/1926 | Kellog |
| 3,088,295 A | 5/1963 | Haines |
| D205,010 S | 6/1966 | Swendsen |
| 4,507,344 A | 3/1985 | Baughman |
| 4,557,455 A | 12/1985 | Benjamin |
| 4,608,734 A | 9/1986 | Schiller |
| D286,373 S | 10/1986 | Hill |
| D292,780 S | 11/1987 | Galask |
| 5,095,636 A | 3/1992 | Arnold |
| 5,212,851 A | 5/1993 | Wantanabe |
| D337,255 S | 7/1993 | Novelli, Sr. |
| 5,490,309 A * | 2/1996 | Velasquez et al. ............. 24/90.1 |
| 5,933,929 A | 8/1999 | Kawakami et al. |
| D466,001 S | 11/2002 | Monson |
| D498,414 S | 11/2004 | Yoneoka |
| D500,245 S | 11/2004 | Okada |
| D602,161 S | 10/2009 | Yazdi |
| D604,786 S | 11/2009 | Millar |
| 2005/0188510 A1* | 9/2005 | Retamal ....................... 24/114.4 |
| 2005/0235462 A1 | 10/2005 | Takahashi et al. |

FOREIGN PATENT DOCUMENTS

| | | |
|---|---|---|
| CA | 2333092 A1 | 12/1999 |
| CA | 2521568 A1 | 3/2007 |

OTHER PUBLICATIONS

International Search Report for PCT/CA2008/001852, International Searching Authority, Jun. 23, 2009, pp. 1-3.

* cited by examiner

*Primary Examiner* — Jack W. Lavinder
(74) *Attorney, Agent, or Firm* — Bull, Housser & Tupper LLP

(57) ABSTRACT

A fastening device and a method of using same is provided. The fastening device includes a male member having a projection on a first side and a securing means on a second opposing side. A female member configured to receive the projection detachably secures the female member onto the male member. The female member and the male member comprises a ratchet system to removeably secure the female member onto the male member. The securing means on the second opposing side of the male member is configured to mate with a corresponding securing member mounted on an object. By securing a material such as a shade screen or a tarp on the male member by mating the male member with the female member, the shade screen or tarp may be detachably fastened onto an object.

13 Claims, 4 Drawing Sheets

MARKING AND FASTENING DEVICE AND METHOD OF USING SAME

CROSS REFERENCE TO RELATED APPLICATIONS

The current application is a continuation of U.S. patent application Ser. No. 11/241,441 entitled MARKING AND FASTENING DEVICE AND METHOD OF USING SAME filed on the 29 day of September 2005.

FIELD OF INVENTION

The present invention relates generally to a fastener assembly, and more particularly, it relates to a marking and fastening device for attachment onto a material.

BACKGROUND OF THE INVENTION

Covers or tarps are typically used to cover and protect various objects from the elements. For example, tarps or covers may be fastened to a boat so as to protect the cabin or seating area of the boat from the rain and other falling debris. Tarps and covers may also be fastened over truck loads to cover the cargo and inhibit loose debris from dislodging.

Such covers or tarps are typically fastened to the target object by way of male/female securing devices such as snap fasteners, lift-a-dot fasteners, and turnbuckles. In the case of snap fasteners, male screw studs are typically mounted around the perimeter of the object, such as around the perimeter of the seating area of a boat. Female sockets are mounted on the tarp material such that the tarp may be detachably fastened onto the male screw studs. To properly fit the tarp over the seating area of the boat, the position of the female sockets must correspond to the fixed position of the male screw studs. The female sockets are usually permanently mounted on selected locations of the tarp material so as to be engageable with the corresponding male screw studs mounted at fixed positions along the perimeter of the boat.

Typically, the female sockets are permanently mounted to the tarp material by riveting. The proper positioning of the female sockets on the tarp material is accomplished by securing the tarp material over the object and marking areas of the tarp material that correspond to the location of each of the male screw studs. The tarp material is then removed from the object to permanently attach the female sockets onto the marked areas on the tarp material.

The marking of the tarp material for proper positioning of the female sockets is a time consuming process and potentially subject to error. The process of securing the tarp material over the object, for example, by way of clamps, is a laborious process that may require multiple re-adjustments and re-securing of the clamps to properly position the tarp material over the object with the appropriate tension. Furthermore, because the female sockets are permanently secured onto the tarp material, any inaccuracies in marking of the tarp may be a costly and time consuming mistake to correct. For example, if the female socket is incorrectly secured onto the tarp material, removal of the female socket can only be accomplished by destroying the female socket such that it may not be reused again.

Applicant is aware of U.S. Pat. No. 5,095,636 issued on Mar. 17, 1992 to Arnold which describes a fabric cover marking device and method for marking the location on a fabric cover for a female fastener portion engageable with a complementary male fastener portion mounted on a structure to be covered.

Applicant is also aware of U.S. Pat. No. 4,608,734 issued on Sep. 2, 1986 to Schiller which describes a quick release threadless fastener for connecting two pieces of material, the fastener including a male and a female fastener assembly each having a fastener element that are detachably engageable with each other.

Applicant is further aware of U.S. Pat. No. 5,490,309 issued on Feb. 13, 1996 to Velasquez et al. which describes a fastener assembly that is readily attached to fabric material without need of sewing, the fastener assembly including a pair of interlocking male and female members, each for placement on opposite side of the fabric material.

The problem with existing fasteners and fastener assemblies is that none of such devices are operable to mark and fasten onto a material. The device described in Arnold discloses a fabric cover marking device but the device itself may not be fastened to the fabric cover. The devices described in Schiller and Velasquez et al. fail to describe a device that may also function as a marking device.

Furthermore, none of the prior art devices provide for a detachably securable female member which enables re-usability of the male and female member for different applications and/or convenient adjustability of the material at any time so as to suitably position the material on the male member to align the male member with a corresponding securing member. Therefore, an unaddressed need for an improved fastening device exists to overcome the inadequacies and deficiencies in the prior art.

SUMMARY OF THE INVENTION

It is an object of the present invention to provide a fastening device that also acts as a marking device.

It is another object of the present invention to provide a marking and fastening device that may be detachably attachable to a material without use of conventional attachment means.

An apparatus for marking a material and mounting the apparatus on the material is provided wherein the apparatus is operable to fasten the material on to an object. The apparatus includes a first member removeably attachable to the object, the first member being adapted to mark the material, and a second member adapted to removeably secure the material to the first member. The first member includes a projection projecting from a first side of the first member, the projection for marking the material and a securing means on a second side opposite the first side of the first member, the securing means for removeably attaching the material to a corresponding securing member mounted on the object. The securing means may be a female socket and the corresponding securing member may be a make stud, the female socket and the male stud forming a detachably securable snap fastener. Alternatively, the securing means may be a male hook material and the corresponding securing member may be a female loop material, the male hook material and the female loop material forming a detachably secureable hook and loop fastener.

The second member defines an aperture configured to detachably receive the projection projecting from the first side of the first member. The projection frictionally engages the aperture so as to detachably secure the second member onto the first member. In an embodiment of the invention, the projection is a prong configured to puncture the material such that the second member may detachably secure the first member onto the material. The apparatus may also include on the first side of the first member a plurality of teeth for engaging the material.

A method of mounting a marking and fastening device onto a material so as to fasten the material onto an object is also disclosed. The method includes the steps of: mounting the material on a male member by puncturing the material with a projection projecting from a first side of said male member; detachably securing the male member onto the material by mating the male member with a female member, the female member configured to receive the projection projecting from the male member; and detachably mating a securing means on a second side of the male member with a corresponding securing member mounted on the object so as to fasten the material onto the object.

The securing means on the second side of the male member may be a female socket and the securing member mounted on the object may be a male stud, the female socket and the male stud thereby forming a detachably securable snap fastener. Alternatively, the securing means on the second side of the male member may be a male hook material and the securing member mounted on the object may be a female loop material, the male hook material and the female loop material thereby forming a detachably secureable hook and loop fastener. In the further alternative, the securing means on the second side of the male member may be a female loop material and the securing member mounted on the object may be a male hook material, the female loop material and the male hook material forming a detachably secureable hook and loop fastener.

The female member defines an aperture configured to detachably receive the projection. The projection frictionally engages the aperture so as to detachably secure the female member onto the male member. The projection may be a sharpened prong for puncturing the material such that the female member may detachably secure the male member onto the material. The first side of the male member may further include a plurality of teeth for engaging the material.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 7:
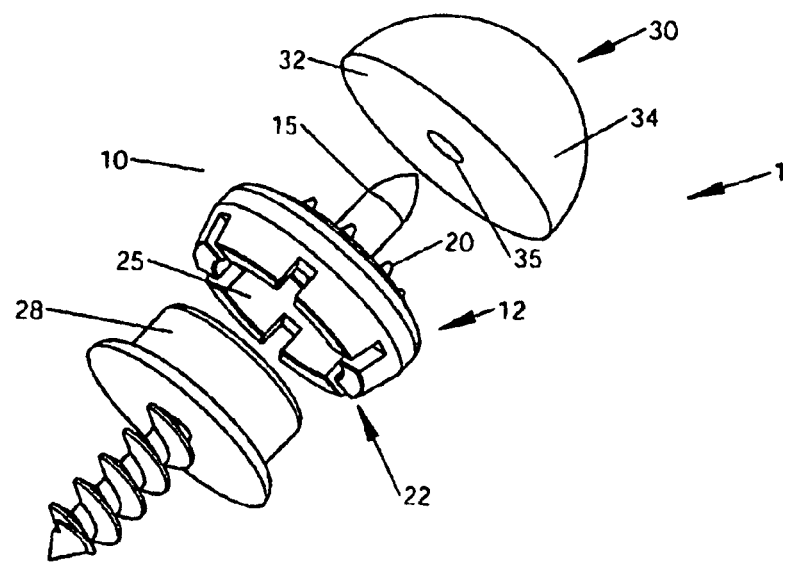
FIG. 7 is an exploded view of the male member, as seen in FIG. 1, detachably received at the first side by the female member, as seen in FIG. 4 and detachably secured at the second opposing side onto a stud.
Figure 8:
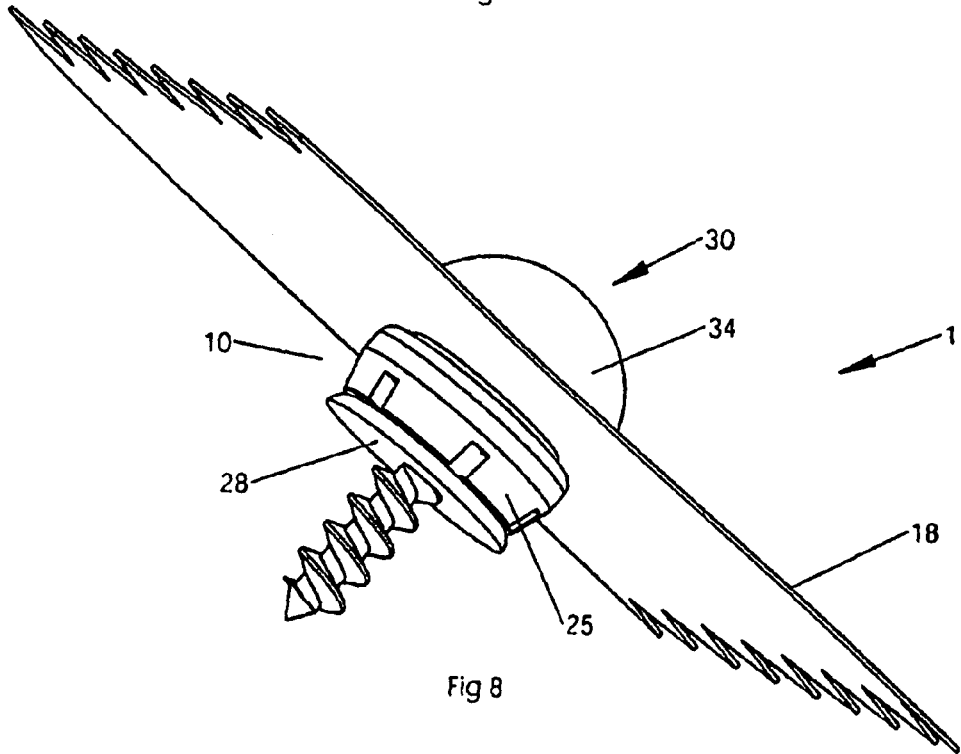
FIG. 8 is a side view of the fastening device detachably secured at the second opposing side onto the stud, as seen in FIG. 7.

With reference to FIGS. 1 to 8, the marking and fastening device 1 of the present invention includes a male member 10 and a female member 30. Marking and fastening device 1 is operable to mark and fasten a material 18, as shown in FIG. 8 and described in greater detail below.

Figure 1:
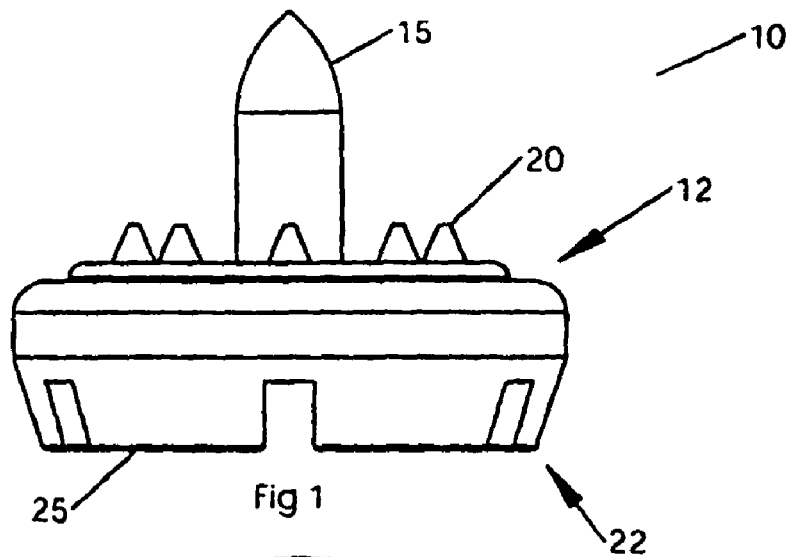
FIG. 1 is a side view of a male member having a prong on a first side and a receiving means on a second opposing side.
Figure 2:
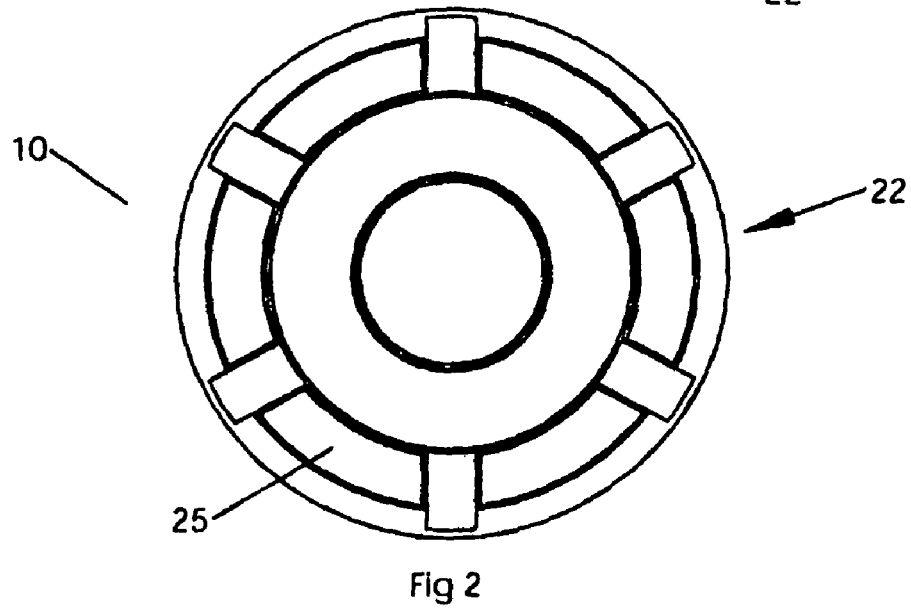
FIG. 2 is a bottom view of the second opposing side of the male member, as seen in FIG. 1.
Figure 3:
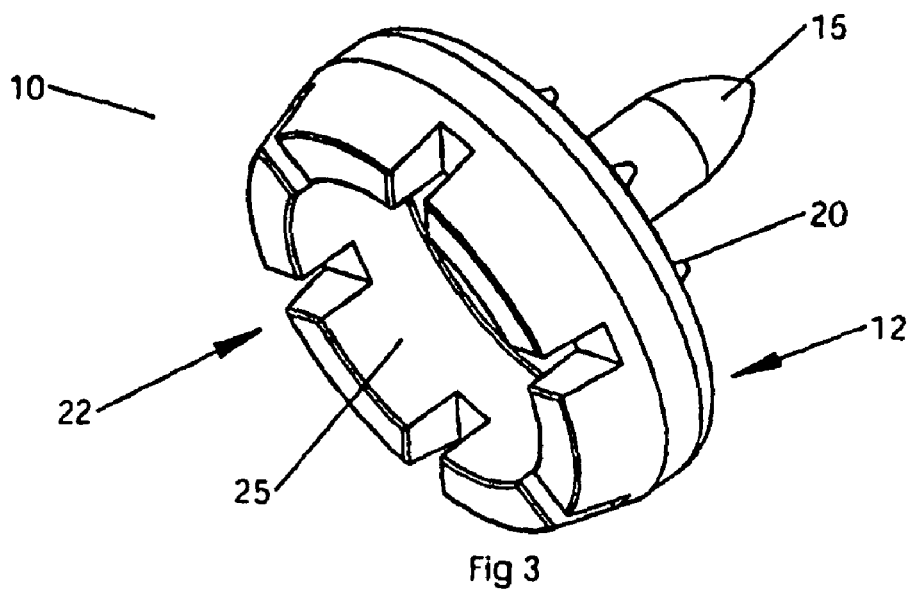
FIG. 3 is a perspective view of the male member, as seen in FIG. 1.

Referring to FIGS. 1 to. 3, male member 10 in accordance with a first embodiment has a first side 12 and a second side 22 opposite first side 12. On first side 12, male member 10 includes a projection such as a prong 15. Prong 15 may be integrally formed on first side 12 of male member 10. Alternatively, prong 15 may be separate from male member 10 and attached to or otherwise coupled with first side 12 of male member 10. Preferably, prong 15 is formed on first side 12 of male member 10 and is configured to puncture any type of material 18. In an embodiment of the invention, prong 15 may be sharpened so as to enable prong 15 to puncture material 18. Material 18 may be any material capable of being punctured by prong 15, including but not limited to materials typically used to make tarps such as heavy duty polyethylene tarp material, nylon tarpaulin fabric, polyester mesh fabrics, or vinyl fabrics. Making material 18 of a lighter fabric such as canvas and cotton is contemplated and within the scope of the present invention. Prong 15 and male member 10 may be made of any durable rigid material so as to be able to provide sufficient strength to prong 15 to puncture material 18. The durable rigid material that male member 10 and prong 15 may be made of include but are not limited to durable plastic materials, such as delrin, or various types of metal, such as stainless steel. In an alternative embodiment of the invention, shown in FIGS. 9 and 10, prong 15 includes at least one ridge 40 configured to frictionally engage a groove 42, as described in greater detail below, to assist in detachably securing male member 10 to female member 30.

In the first embodiment, first side 12 of male member 10 also includes a plurality of teeth 20. Plurality of teeth 20 may be made of the same durable material as male member 10. Teeth 20 are configured to engage material 18 to secure material 18 onto first side 12 of male member 10 when material 18 is removably mounted on male member 10 by puncturing material 18 with prong 15. Preferably, teeth 20 are sharp so as to engage or hook onto material 18 when material 18 is mounted on male member 10.

In the first embodiment, on second side 22, male member 10 includes a securing means 25 such as a female socket of a conventional snap fastener. Securing means 25 is preferably integral to male member 10. Alternatively, securing means 25 may be separate from male member 10 and attached or otherwise coupled to second side 22 of male member 10. Securing means 25 may be made of the same durable material as male member 10. Additionally or alternatively, securing means 25 may be a male member or a female member of any conventional fastening device configured to mate with a corresponding female or male member 28, respectively. For example, securing means 25 may be the male stud or eyelet portion or the female socket or cap portion of a conventional snap fastener or securing means 25 may be the male hook portion or the female loop portion of a conventional hook and loop fastener commonly known as VELCRO™. Preferably, in the first embodiment, securing means 25 is a female socket portion formed integrally on second side 22 of male member 10 wherein the female socket portion is configured to detachably mate with a corresponding male member 28 such as a male stud portion so as to form a detachably securable snap fastener. For example, in use, securing means 25 may be a female socket portion configured to detachably mate with a corresponding male screw stud 28 mounted on an object such as a boat.

Figure 4:
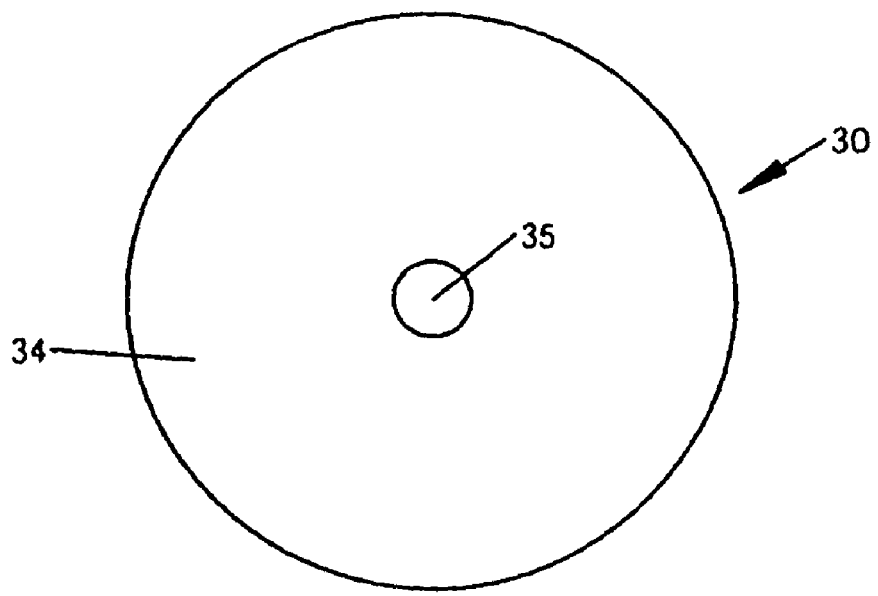
FIG. 4 is a plan view of a female member having a receiving means.
Figure 5:
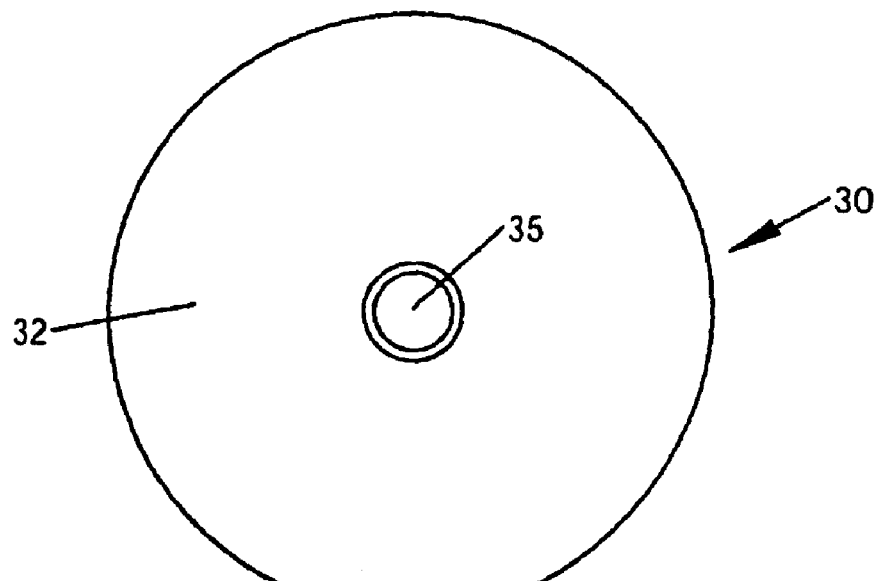
FIG. 5 is a bottom view of the female member as seen in FIG. 4.
Figure 6:
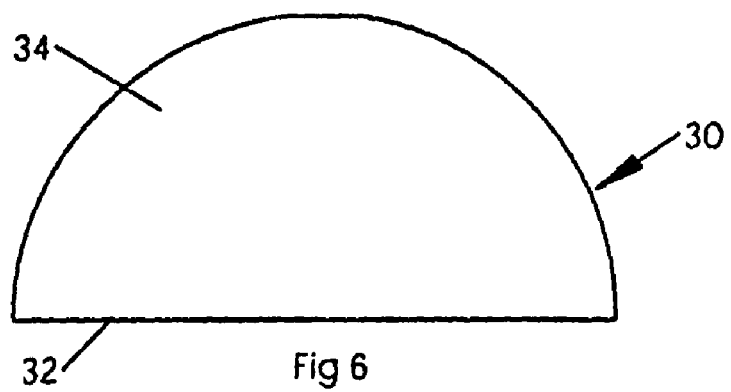
FIG. 6 is a side view of a female member as seen in FIG. 4.

Referring to FIGS. 4 to 6 and 7 to 8, female member 30 has in accordance with the first embodiment a first side 32 which is generally planar and a second side 34 opposite first side 32, which may be dome shaped, although other geometrical configurations of female member 30 are contemplated and within the scope of the present invention. Female member 30 is configured to mate with male member 10 so as to detachably secure female member 30 onto male member 10. In the first embodiment of the invention, female member 30 is operable to receive prong 15 of male member 10 into an aperture 35 sized and shaped to receive prong 15. As shown in FIGS. 4 and 5, aperture 35 extends through female member 30 along a central axis generally perpendicular to first side 32 of female member 30. Female member 30 may detachably secure onto male member 10 by inserting prong 15 into aperture 35 such that prong 15 frictionally engages the interior surface of aperture 35 to detachably secure prong 15 within aperture 35. Female member 30 may have any dimensions that permit female member 30 to detachably mate with male member 10. In the alternative embodiment, shown in FIGS. 9 and 10, wherein prong 15 includes at least one ridge 40, the interior surface of aperture 35 defines a groove 42 wherein the ridge on prong 15 may slide into so as to securely engage male member 10 to female member 30. When prong 15 having the ridge 40 is inserted into aperture 35, sufficient force may be applied such that the ridge 40 slides past and into the groove 42 on the interior surface of aperture 35 to assist in securing male member 10 to female member 30 while still remaining detachable. Preferably, female member 30 is made of the same durable material as male member 10.

Operation

Referring to FIGS. 7 and 8, the marking and fastening device 1 of the first embodiment may be used to mark material 18 and then detachably fastened onto material 18. Securing means 25 on second side 22 of male member 10 may therefore detachably fasten onto a corresponding securing member 28 mounted on or otherwise coupled with an object such as a boat (not shown), for example.

In a typical operation, securing means 25 such as female sockets are removeably attached to securing members 28 such as male stud portions mounted on an object, such as a boat, thereby exposing prong 15 of male members 10 in a desired pattern along the surface of the object. Material 18, which may be a tarp, may be laid across the portion of the object defined by the pattern of exposed prongs 15 and stretched and/or aligned as desired. After laying material 18 across the exposed prongs 15, pressure may be applied to material 18 or portions thereof so as to cause one or more prongs 15 to mark material 18, including puncturing material 18 to indicate one or more locations on material 18 where female member 30 may be removeably attached to secure male member 10 and female member 30 on material 18. After puncturing material 18 with prongs 15 of male member 10, teeth 20 of male member 10 may assist in securing the position of material 18 on male member 10. Advantageously, female member 30 detachably secures onto male member 10 by inserting prong 15 into aperture 35 such that prong 15 frictionally engages the interior surface of aperture 35 to detachably secure prong 15 within aperture 35. Typically, female member 30 is detachably secure to male member 10 such that first side of 32 of female member 30 is adjacent material 18, as shown in FIG. 8.

Once material 18 is positioned on male member 10 and secured into position by inserting prong 15 into aperture 35 to secure female member 30 onto male member 10, each socket 25 is operable to detachably mate with a corresponding stud 28 to detachably fasten material 18 onto the object.

Advantageously, if male member 10 is wrongly positioned on material 18, female member 30 may be detached, without deforming or otherwise damaging female member 30, to release material 18 from prong 15 and repositioned for marking and/or puncturing at an alternate location. Advantageously, male member 10 and female member 30 may be detached and reused, even if they were previously secured onto material 18. For example, material 18 may be a boat tarp for securing over a boat to protect the open seating area of the boat from the elements. Male member 10 may be adjustably positioned along the perimeter of boat tarp material 18 such that the position of socket 25 corresponds with the fixed position of each stud 28 mounted on the boat. Male member 10 and female member 30 may conveniently be adjustably mounted on the material 18, which may be a boat tarp, including detaching female member 30 from material 18, releasing male member 10 from material 18 and re-puncturing material 18 with the prong 15 of the male member 10 at a new location of material 18, and re-attaching female member 30 to the male member 10 at the new location. Once material 18 is properly positioned on male member 10 by detachably securing female member 30 on male member 10, socket 25 may be detachably attached to each corresponding stud 28.

Figure 9:
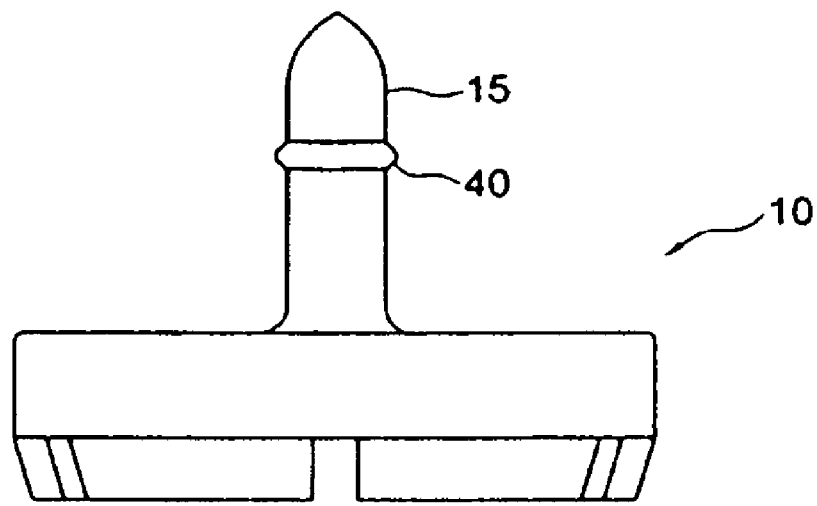
FIG. 9 is a side view of a male member of an alternate embodiment having a ridge on the prong.
Figure 10:
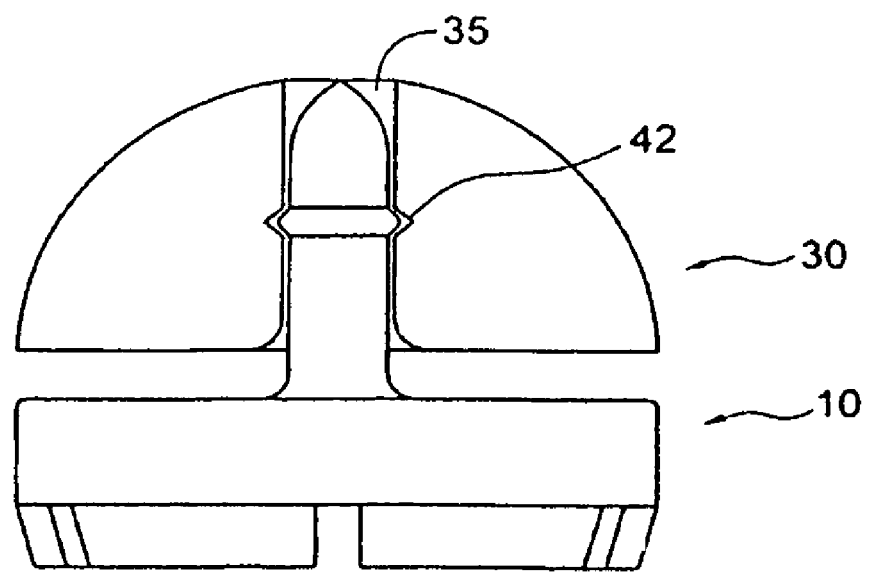
FIG. 10 is a plan view of the male and female members of the embodiment of FIG. 9, the female member having a groove to mate with the ridge.

In an alternative embodiment of the invention shown in FIGS. 9 and 10, the interior surface of aperture 35 defines at least one groove 42 and prong 15 includes a correspondingly dimensioned ridge 40. When prong 15 of the alternative embodiment is inserted into aperture 35, sufficient force may be applied such that the ridge 40 slides past and into the groove 42 on the interior surface of aperture 35 to assist in securing male member 10 to female member 30 while still remaining detachable.

From the foregoing description, it may be seen that the device formed in accordance with the present invention incorporates many novel features and offers significant advantages over those currently available. While the presently preferred embodiment of the invention has been illustrated and described, it is to be understood that within the scope of the appended claims, various changes can be made therein without the departing from the scope of the invention.

What is claimed is:

1. An apparatus for marking a material and mounting the apparatus on the material so as to fasten the material on to an object, the apparatus comprising:

a) a first member removeably attachable to the object, said first member comprising a projection configured for marking and puncturing the material, said projection projecting from a first side of said first member and including at least one annular ridge in a plane generally perpendicular to the longitudinal axis of the projection; and b) a second member adapted to removeably secure the material to said first member, the second member including an aperture with an annular groove in a plane generally perpendicular to the longitudinal axis of the aperture, said aperture configured to receive said projection whereby said at least one annular ridge on the projection engages the annular groove on the aperture so as to detachably secure said second member onto said first member whereby said second member is detachable from said first member without causing damage to said annular groove or said at least one annular ridge to a level which prevents secure reattachment of the second member to said first member by reengagement of said annular groove with said at least one annular ridge.

2. The apparatus of claim 1 wherein said first member includes a securing means which is removeably attachable to a securing member on the object, said securing means on a second side opposite said first side of said first member.

3. The apparatus of claim 2 wherein said securing means is a female socket and said corresponding securing member is a male stud, said female socket and said male stud forming a detachably securable snap fastener.

4. The apparatus of claim 1 wherein said first side of said first member further comprises a plurality of teeth for engaging the material.

5. The apparatus of claim 1 wherein said second member is detachable from said first member without causing any damage to said annular groove or said at least one annular ridge.

6. A marking and fastening device for detachably fastening the device onto a material so as to detachably mount the material onto an object, the marking and fastening device comprising:
   a) a male member having a prong, with at least one annular ridge in a plane generally perpendicular to the longitudinal axis of the prong, on a first side and a securing means on a second side opposite said first side, said prong configured to puncture the material, said securing means configured to mate with a corresponding securing member mounted on the object; and
   b) a female member defining an aperture, said aperture configured for frictional fit engagement with said prong to removably secure said material to the device and having an annular groove in a plane generally perpendicular to the longitudinal axis of the aperture to receive and removably secure the at least one annular ridge of said prong therein configured to permit withdrawal of said prong from said aperture without causing damage to said annular groove or said at least one annular ridge to a level which prevents reuse of said male member and said female member to again removably secure said material to the device.

7. The marking and fastening device of claim 6 wherein said securing means is a female socket and said corresponding securing member is a male stud, said female socket and said male stud forming a detachably securable snap fastener.

8. The marking and fastening device of claim 6 wherein said securing means is a male hook material and said corresponding securing member is a female loop material, said male hook material and said female loop material forming a detachably securable hook and loop fastener.

9. The marking and fastening device of claim 6 wherein the prong comprises a tip for marking and puncturing the material and the aperture is longer than the prong such that when fastened together the tip of the prong is contained within the aperture.

10. The marking and fastening device of claim 9 wherein said female member comprises a dome shaped outer side with the aperture extending along the central axis of the dome.

11. The marking and fastening device of claim 10 wherein said female member comprises a flat inner side perpendicular to the central axis of the dome.

12. The marking and fastening device of claim 9 wherein said ridge is correspondingly dimensioned with said groove and wherein said ridge comprises a central annular apex with symmetrically shaped first and second sides connected together at said apex and extending away from each other towards said prong at the same angle with respect to a plane perpendicular to said prong extending through said apex, to form an annular wedge shape.

13. The marking and fastening device of claim 6 wherein said female member is detachable from said male member without causing any damage to said annular groove or said at least one annular ridge.

* * * * *